A. W. WHITLOCK.
WATER ELEVATOR.
APPLICATION FILED MAR. 26, 1909.
936,204.
Patented Oct. 5, 1909.
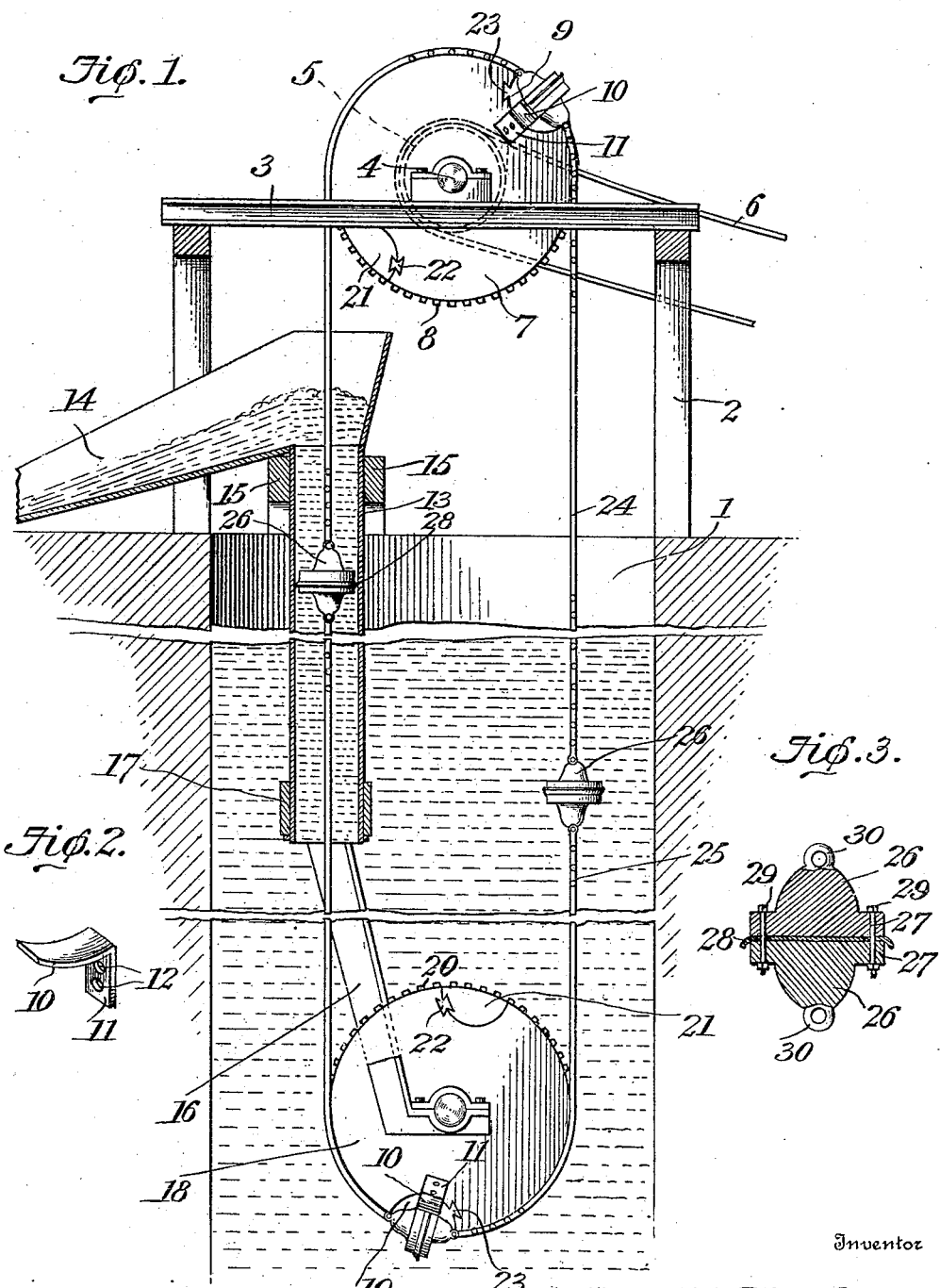
Witnesses
Fenton S. Belt
E. R. Bunyea
Inventor
Arthur W. Whitlock.
By Victor J. Evans
Attorney

UNITED STATES PATENT OFFICE.

ARTHUR W. WHITLOCK, OF LAKE ARTHUR, TERRITORY OF NEW MEXICO.

WATER-ELEVATOR.

936,204.  Specification of Letters Patent.  Patented Oct. 5, 1909.

Application filed March 26, 1909. Serial No. 485,991.

*To all whom it may concern:*

Be it known that I, ARTHUR W. WHITLOCK, a citizen of the United States of America, residing at Lake Arthur, in the county of Chaves and Territory of New Mexico, have invented new and useful Improvements in Water-Elevators, of which the following is a specification.

This invention relates to water elevators, designed more particularly for use in irrigating systems but capable of uses in other relations, and one of the principal objects of the invention is to provide simple and reliable means for elevating water and discharging it in a continuous stream.

Another object of the invention is to provide means whereby a given quantity of water may be elevated and discharged continuously in a stream.

These and other objects may be attained by means of the construction illustrated in the accompanying drawing, in which,—

Figure 1 is a sectional view taken through a well and showing a water elevator made in accordance with my invention located therein. Fig. 2 is a detail perspective view of one of the wings for supporting the water lifter. Fig. 3 is a detail sectional view taken through one of the water lifters.

Referring to the drawing, the numeral 1 designates a well or pit, and 2 is the well frame provided with cross bars 3. Journaled on the cross bars 3 is a driving shaft 4, said shaft being provided with a pulley 5 and a belt 6 which leads to a suitable source of power for rotating the shaft 4. Upon the shaft 4 is keyed a sprocket wheel 7 provided with suitable teeth 8, and in the periphery of said sprocket wheel recesses 9 are provided. At opposite sides of the sprocket wheel curved wings 10 are secured, said wings having angular lugs 11 provided with screw holes 12 through which the fastening screws extend to secure the wings 10 upon opposite sides of the sprocket wheel 7.

Extending down into the well is a tube or casing 13, said casing having fitted to its upper end a discharge spout 14, and said casing being supported upon suitable bars 15 secured to the well curb. Connected to the lower end of the casing 13 is a bracket 16, said bracket having a ring 17 at its upper end which fits around the casing 13. At the lower end of the bracket 16 a bearing is provided for a sprocket wheel 18 similar to the wheel 7, said sprocket wheel having oppositely disposed recesses 19 and provided with suitable sprocket teeth 20. The recesses 9 and 19 are designed to be closed by means of suitable sectors 21, the outer portions of which conform to the periphery of the sprocket wheels, said sectors being held in place by dovetailed wedges 22 driven into recesses 23 formed in the sprocket wheel.

The sprocket chain 24 is provided with suitable rings 25 which engage the teeth of the sprocket wheels, and at intervals upon said chain are connected the water lifters, each consisting of the dome-shaped members 26 having annular face plates 27. Clamped between the face plates 27 is a rubber disk or gasket 28, the bolts 29 extending through the face plates 27 and through the gasket 28. On the members 26 loops or eyes 30 are provided, and the chain links are connected to these loops. The water lifters are designed to move through the casing 13 with the rubber gasket or disk 28 fitting nicely against the inner wall of said casing to raise the water and to discharge it into the spout 14. In order to regulate the amount of water to be elevated any suitable number of water lifters may be connected to the chain 24, and where but two are used the recesses in the sprocket wheels may be closed by the sectors 21.

The operation of my invention may be briefly described as follows: As the driving shaft 4 is rotated the drive chain 24 is moved in the direction indicated by the arrow, and the water lifters are engaged by the recesses 9 and 19 in the sprocket wheels 7 and 18, and as the water lifters pass up through the casing 13 the water is discharged into the spout 14. Whenever it is necessary to have a larger quantity of water discharged, the segments 21 are removed, and water lifters are secured to the belt 24 to engage the recesses in which the segments were placed.

From the foregoing it will be obvious that a continuous supply of water may be elevated by my invention and that the device is comparatively simple in which there are few parts, and that the device as a whole can be quickly installed at low cost.

I claim:—

In a water elevator, a drive chain, water lifters connected to said drive chain, said water lifters consisting of oppositely disposed members, a gasket or disk clamped between said members, sprocket wheels provided with recesses, curved wings secured to the opposite sides of said sprocket wheels at the recesses, and a casing through which the water lifters pass to discharge the water.

In testimony whereof I affix my signature in presence of two witnesses.

ARTHUR W. WHITLOCK.

Witnesses:
 JOHN B. MORRIS,
 ELRIE C. JACKSON.